2,965,680

ALCOHOL REFINING PROCESS

John W. Andersen and Robert A. Heimsch, Dayton, Ohio, assignors to Monsanto Chemical Company, St. Louis, Mo., a corporation of Delaware No Drawing. Filed July 3, 1957, Ser. No. 669,696

6 Claims. (Cl. 260—643)

The present invention relates to a process for the refining of alcohols produced by the Oxo process.

The Oxo process utilizes olefins which are reacted with carbon monoxide and hydrogen at elevated temperatures and pressures in order to produce aldehydes as the primary products. The aldehydes are then hydrogenated to alcohols which are esterified to produce plasticizers and other useful compositions. It has been found, however, that the alcohols thus obtained in the Oxo process also contain a number of impurities which result from side reactions occurring in the Oxo process. Such impurities include various unsaturated aldehydes, aldols, acetals and acids. The proportion of such impurities may be quite small, varying with the conditions of the Oxo process, but it has been found that these impurities exert a deleterious effect upon the quality of the ultimate alcohols and esters. Such deleterious effects as color and electrical properties are particularly noticeable when the esters are employed as plasticizers, for example in the plasticizing of polyvinyl chloride.

It has now been found that the above-described Oxo alcohol reaction mixtures may be refined by treatment with a dry gel composed of a combination of silica and alumina, in which the proportion of silica is from 40% 98% by weight of the total gel. This process is applicable to the Oxo alcohols obtained from starting olefins having from 2 to 12 carbon atoms such as ethylene, propylene, including the dimer, trimer and tetramer thereof, and butylene including the dimer and trimer.

The treatment of the crude alcohol with the gel mixture is usually carried out by passing the crude Oxo alcohols through a bed of particles of the gel. However, if a batch treatment is desired, the alcohol mixture may be slurried with particles of the silica-alumina gel, after which the gel is allowed to settle and the refined alcohol mixture withdrawn. The particle size of the gel is not critical and it has been found that good results are obtained with a finely-divided type of gel, e.g., having an average particle size of less than 100 mesh or with relatively large particles having an average size of about one-half inch, the latter being partly applicable to large-scale operations. The proportions of the gel and the Oxo alcohol mixture are likewise without criticality and it has been found that flow rates of as high as 1,000 pounds of alcohol per hour per cubic foot of the silica-alumina gel may readily be employed with satisfactory purification.

The temperature of the present treating process is maintained within the range of from 40° C. to 200° C., a preferred range being from 60° C. to 180° C.

The present refining process may be carried out directly on the crude alcohols obtained by the hydrogenation of the primary aldehydes from oxonation or they may be carried out on a product which has undergone some preliminary purification. Such preliminary purification may comprise a caustic treatment, as by the use of an equal volume of a 50% caustic solution with the crude alcohols. If desired, a more dilute alkaline treatment such as treatment with an equal volume of 15% sodium bicarbonate solution may be employed.

If it is desired to employ a distillation pretreatment upon the crude alcohol mixture before the present refining step, it has been found that such pretreatment enables a faster throughput to be obtained in the treatment of the Oxo alcohol with the gel. However, the use of caustic treatment or distillation is not essential in the present method and the gel treatment has been found to be completely effective even in the presence of residual aldehydes, aldols, acetals and acids.

It has been found that silica-alumina gels in dry form having from 40% to 98% of silica are effective in the present refining process. However, it has been found that silica-alumina gels of high surface area are particularly effective for this purpose. The measurement of the surface area of the dry gel particles is carried out by an oil absorption test, since it has been found that high oil absorption is a direct measure of surface area. A surface area test employed with the present silica-alumina gels is the Gardner-Coleman method in which 5 g. of the dry gel are mixed on a glass plate with successive additions of raw linseed oil which is worked into the mass with a spatula until the end point is reached when the material has become a stiff putty-like paste. The amount of linseed oil thus taken up is represented as the percentage of oil with respect to the dry weight of the gel. It has been found that a preferred group of silica-alumina gels for the present refining process are those having surface areas corresponding to oil absorption percentages of from 50% to 150%, a preferred range being from 60% to 130%.

The silica-alumina gels of the present invention are based upon precipitated gels of hydrosols of silica and alumina, which may be co-precipitated or successively precipitated, for example, by first forming a gel of alumina, drying this to obtain a dehydrated gel and thereafter adding the particles of the dehydrated gel to a liquid gel of silica in order to precipitate the silica upon the alumina. The gels are dehydrated by drying at a temperature in the range of 300° C. to 500° C. It is essential, however to utilize combination gels in which the proportion of silica is in the range of from 40% to 98% by weight of the gel. The gels are readily regenerated after prolonged use by heating in the presence of oxygen to a temperature of 300° C. to 500° C.

The test which is applied to the Oxo alcohol in order to measure the purity thereof is based upon the formation of color by treatment with sulfuric acid, followed by photometric measurement of the color of the treated alcohol. This test is conducted by utilizing 6 ml. of the alcohol which are agitated together with 0.5 ml. of concentrated sulfuric acid, and the mixture placed in a 100° C. oil bath for one hour. The mixture is then removed and placed in a light transmission cell for measurement in an electrophotometer. The light transmission is measured utilizing Corning filters which have peaks at 5,562 Angstroms and 5,840 Angstroms. Crude alcohol from the hydrogenation of the aldehydes resulting from oxonation of the trimer of propylene has been found to give a light transmission value of from 20% to 40%, while the refined alcohol of the present process gives a light transmission value of from 95% to 98%.

The following examples illustrate specific embodiments of the present invention.

*Example 1*

The Oxo alcohol employed in the present treating process was obtained by the oxonation of propylene trimer with carbon monoxide and hydrogen to obtain a crude mixture of aldehydes which were then hydrogenated over Raney nickel to give a product consisting essentially of isodecyl alcohol. The mixture also contained appreciable proportions of unreacted hydrocarbons, isodecyl formate, isodecyl aldehyde, isodecanoic acid, as well as minor proportions of various acetals, aldols, ethers, ketones and unsaturated aldehydes. The crude alcohol mixture was distilled to remove hydrocarbons and heavy residual products leaving the alcohol mixture containing as the only important impurities, the saturated and unsaturated aldehydes, formate esters and acids. The alcohol fractions resulting from the distillation were found to have light transmission values of from 10% to 51%, as measured by the test described above. The alcohol cut from the distillation was treated with 15 volume percent of a 50% aqueous solution of sodium hydroxide, which was found to have relatively little effect upon the light transmission value. The alcohol mixture was then slurried with 2.4% by weight of a dry silica-alumina gel containing 86% of silica. The silica-alumina gel was stirred with the alcohol for a period of one hour at a temperature of 160° C., after which the gel was settled and the alcohol withdrawn and filtered and treated with NaOH. The treated isodecyl alcohol fraction when subjected to the sulfuric acid test and the measurement of light transmission was found to have a value of 98%.

*Example 2*

A sample of crude butyl alcohol obtained by the oxonation of propylene and hydrogenation of the aldehyde, when subjected to the refining process of Example 1 shows a similar improvement in quality.

It was also found that the gel could be regenerated after prolonged use by heating the gel in the presence of oxygen at a temperature of 400° C.

*Example 3*

The direct oxonation of propylene was found to give a mixture of normal and iso butyraldehydes. Separation of the normal compound and aldolization followed by hydrogenation then gave a crude 2-ethylhexanol containing 2-ethylhexyl formate, and 2-ethylhexanal as the principal impurities. The crude alcohol when subjected to the refining process of Example 1 was found to be similarly improved in light transmission, indicative of improved purity.

*Example 4*

In order to illustrate the continuous processing refining of alcohol, the crude alcohol mixture of Example 1 was passed through a 10 mm. tube packed to a depth of 380 mm. with 3mm. particles of silica-alumina gel containing 86% by weight of silica. The treated alcohol was found to have a purity rating similar to that of Example 1.

*Example 5*

In order to illustrate the effect of the surface area of the silica-alumina gel employed in the present alcohol refining process, a series of runs was conducted utilizing gels having various surface areas as measured by the oil absorption test described above. The crude alcohol employed was the same as that described in Example 1 above and the tests were conducted with continuous processing through a tube as described in Example 4. As control tests, runs were also carried out in which the said crude alcohol was passed through similar beds of pure silica and pure alumina of comparable particle size and with the respective surface areas noted in the table below:

| Treating Agent | Surface Area (% Absorption) | Light Transmission |
| --- | --- | --- |
| 86% SiO$_2$–14 Al$_2$O$_3$ | 114 | 97 |
| 86% SiO$_2$–14 Al$_2$O$_3$ | 94 | 90 |
| 86% SiO$_2$–14 Al$_2$O$_3$ | 60 | 76 |
| 100% SiO$_2$ | 60 | 70 |
| 100% Al$_2$O$_3$ | 55 | 46 |

*Example 6*

The effect of temperature of treatment is shown in the present example. The process of Example 4 was carried out at a number of temperatures and the alcohol quality determined by the sulfuric acid test and measurement of the light transmission value. The results obtained with an 86% SiO$_2$—14% Al$_2$O$_3$ gel are summarized below:

| Temperature, ° C.: | Light transmission |
| --- | --- |
| 75 | 90 |
| 141 | 92 |
| 180 | 98 |
| 200 | 90 |

What is claimed is:

1. Process for the refining of crude alcohols obtained by the oxonation of olefins with carbon monoxide and hydrogen, followed by hydrogenation to transform primary aldehydes to alcohols, which comprises contacting the said alcohols with a dry silica-alumina gel in which the proportion of silica is from 40% to 98% by weight of the gel whereby the impurities of the said crude alcohol are adsorbed on the gel, and thereafter separating the treated alcohol from the said gel.

2. Process for the refining of crude alcohols obtained by the oxonation of olefins with carbon monoxide and hydrogen, followed by hydrogenation to transform primary aldehydes to alcohols, which comprises contacting the said alcohols with a dry silica-alumina gel in which the proportion of silica is from 40% to 98% by weight of the gel, the said gel having a surface area corresponding to an oil absorption value of from 50% to 150% whereby the impurities of the said crude alcohol are adsorbed on the gel.

3. Process for the refining of alcohols having from 3 to 13 carbon atoms and obtained by the oxonation and hydrogenation of olefins having from 2 to 12 carbons with carbon monoxide and hydrogen to obtain aldehydes followed by hydrogenation of the said aldehydes to alcohols, which comprises contacting the said mixture with a dry silica-alumina gel having from 40% to 98% by weight of silica relative to the weight of the said gel, and a surface area corresponding to an oil absorption value of from 50% to 150% whereby the impurities of the said crude alcohol are adsorbed on the gel, the said contacting being conducted at a temperature in the range of from 40° C. to 200° C. and thereafter separating the treated alcohol from the said gel.

4. Process for the refining of crude butyl alcohol which comprises contacting the said crude alcohol with a dry silica-alumina gel having from 40% to 98% by weight of silica relative to the weight of the said gel, and a surface area corresponding to an oil absorption value of from 50% to 150% whereby the impurities of the said crude alcohol are adsorbed on the gel, the said contacting being conducted at a temperature in the range of from 40° C. to 200° C., and thereafter separating the treated alcohol from the said gel.

5. Process for the refining of crude isodecyl alcohol which comprises contacting the said crude alcohol with a dry silica-alumina gel having from 40% to 98% by weight of silica relative to the weight of the said gel, and a surface area corresponding to an oil absorption value of from 50% to 150% whereby the impurities of the said crude alcohol are adsorbed on the gel, the said contacting being conducted at a temperature in the range of from 40° C. to 200° C., and thereafter separating the treated alcohol from the said gel.

6. Process for the refining of crude 2-ethylhexyl alcohol which comprises contacting the said crude alcohol with a dry silica-alumina gel having from 40% to 98% by weight of silica relative to the weight of the said gel, and a surface area corresponding to an oil absorption value of from 50% to 150% whereby the impurities of the said crude alcohol are adsorbed on the gel, the said contacting being conducted at a temperature in the range of from 40° C. to 200° C., and thereafter separating the treated alcohol from the said gel.

References Cited in the file of this patent

UNITED STATES PATENTS

| | | |
|---|---|---|
| 2,619,497 | Hockberger | Nov. 25, 1952 |
| 2,621,203 | Cope | Dec. 9, 1952 |
| 2,647,150 | Askevold | July 28, 1953 |

OTHER REFERENCES

Cassidy: "Adsorption and Chromatography," Interscience, N.Y., 1951, pages 177–80, 197.